United States Patent Office 3,382,258
Patented May 7, 1968

3,382,258
4α,8,14 - TRIMETHYL-18-NOR-5α,8α,14β-ANDRO-STANE-3,11,17-TRIONE AND DERIVATIVES THEREOF
Patrick A. Diassi, Westfield, and Gerald W. Krakower, Elizabeth, N.J., assignors to E. R. Squibb & Sons, Inc., New York, N.Y., a corporation of Delaware
No Drawing. Continuation-in-part of application Ser. No. 399,339, Sept. 25, 1964. This application Oct. 3, 1966, Ser. No. 583,955
4 Claims. (Cl. 260—397.3)

ABSTRACT OF THE DISCLOSURE

This invention relates to 4α,8,14-trimethyl-18-nor-5α,8α,14β-androstane-3,11,17-trione and derivatives thereof which are useful as protein anabolic agents.

---

This application is a continuation-in-part application of Ser. No. 399,339, filed Sept. 25, 1964 now abandoned.

This invention relates to and has as its object the provision of new physiologically active steroids, novel methods for their production and new intermediates useful in said preparation. More particularly, this invention relates to the preparation of compounds of the formula

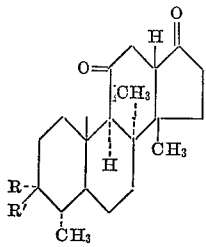

wherein R' is hydrogen; R is selected from the group consisting of hydroxy and acyloxy and together R and R' is oxo (O=).

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The final products of this invention are physiologically active steroids which possess protein-anabolic activity and which may be used in place of such known protein-anabolic steroids such as 17-ethyl-19-nortestosterone in the treatment of post-operative shock and other conditions where tissue dengeneration has occurred. Administration of the products of this invention may be accomplished either perorally or parenterally, in the same manner as 17-ethyl-19-nortestosterone, for example, the dosage and/or concentration being adjusted for the relative potency of the particular steroid and the requirements of the patient.

The steroids of this invention have an abnormal configuration. This configuration differs from normal steroids in that the 8, 9, 13 and 14 positions are different than in normal steroids. In the present series the configuration in these positions is 8α,9β,13α, and 14β. It was surprising to find that the compounds of this invention possess chemical properties which are different from normal steroids. For example, the 9-beta starting material of this invention would be expected to be the stable form. However, it was discovered that this starting material could be epimerized to the new 9-alpha compounds of the instant invention. Further in a normal steroid configuration (the steroid has a 9-alpha configuration), the 11-keto group would be expected to be reduced with sodium borohydride or lithium aluminum hydride. It was found that the new compounds of this invention, possessing a 9-alpha configuration could not be so reduced.

The final compounds of this invention may be prepared according to the processes of this invention beginning with 3α - acyloxy-4α,8,14-trimethyl-18-nor-5α,8α,9β,14β-androstane-11,17-dione (e.g., 3α-acetoxy - 4α,8,14 - trimethyl-18-nor-5α,8α,9β,14β-androstane-11,17 - dione) as starting material.

In the first step of the novel process of this invention, the starting material is hydrolyzed and epimerized as by treatment with an alcoholic alkali metal base, for example, ethanolic potassium hydroxide to yield the 3-hydroxy-5α,8α,14β-androstane which is a new compound of the instant invention.

The 3-hydroxy-5α,8α,14β-androstane derivative may then be acylated as by treatment with an acylating agent, for example, an acyl halide or acidic anhydride in the presence of an organic solvent, preferably a base, for example, pyridine or collidine to yield the 3-acyloxy derivative which is also a new compound of the instant invention.

Alternatively, the 3-hydroxy-5α,8α,14β-androstane derivative may be oxidized as by treatment with an oxidizing agent, for example, chromic acid to yield the new 3-keto final products of the instant invention.

The invention may be further illustrated by the following examples:

EXAMPLE 1

3α-hydroxy-4α,8,14-trimethyl-18-nor-5α,8α,14β-androstane-11,17-dione

A solution of 50 ml. of 5% ethanolic potassium hydroxide is heated to reflux under a blanket of helium. To the hot solution is added 483 mg. of 3α-acetoxy-4α,8,14-trimethyl-18-nor-5α,8α,9β,14β-androstane - 11,17 - dione (prepared in accordance with the teachings in Comptes Rendus, de l'Academie des Sciences, Volume 258, pages 3491 to 3494, April 1964) and the mixture is refluxed for ninety-two minutes under helium, the reaction mixture is then acidified with 20% sulfuric acid, cooled and diluted with water. After evaporation of the solvent the aqueous residue is extracted with methylene chloride and the methylene chloride solution washed with water until neutral, dried over magnesium sulfate and evaporated to give 476 mg. of residue. Trituration with ether gives 223 mg. of 3α - hydroxy-4α,8,14-trimethyl-18-nor-5α,8α,14β-androstane-11,17-dione, M.P. 225–230° C. Recrystallization from methanol gives analytically pure material, M.P. 237–239° C., $[\alpha]^{31}$ —176° (chf.), $\lambda^{KBr}$ 2.90, 5.76, 5.97μ, NMR (CDCl$_3$) 9.09τ (singlet, 3H), 9.04τ (doublet, J=6, 3H), 8.99τ (singlet, 3H), 8.81τ (singlet, 3H), 6.25τ (broad, 1H).

Analysis.—Calc'd for C$_{21}$H$_{32}$O$_3$: C, 75.86; H, 9.70. Found: C, 75.80; H, 9.75.

EXAMPLE 2

3α-acetoxy-4-α,8,14-trimethyl-18-nor-5α,8α,14β-androstane-11,17-dione

A solution of 227 mg. of 3α-hydroxy-4α,8,17-trimethyl-18-nor-5α,8α,14β-androstane-11,17-dione in 5 ml. of pyridine and 2.5 ml. of acetic anhydride is left overnight at room temperature. The excess acetic anhydride is decomposed with water and the mixture evaporated. Two crystallizations from methanol gives 100 mg. of 3α-acetoxy-4α,8,14 - trimethyl - 18-nor-5α,8α-androstane-11,17-dione, M.P. 202–205° C. The analytical sample has melting point 203–205° C., $[\alpha]_D^{29}$ −154° (chf.); $\lambda^{KBr}$ 5.75, 5.78 (sh), 5.92, 8.0–2.1μ; NMR (CDCl$_3$) 9.11τ (doublet, J=6, 3H), 9.07 (singlet 3H), 8.97 (singlet, 3H), 8.78τ (singlet, 3H), 7.93τ (singlet, 3H), 5.08τ (multiplet, 1H).

*Analysis.*—Calc'd for C$_{23}$H$_{34}$O$_4$: C, 73.76; H, 9.15. Found: C, 73.83; H, 9.19.

Similarly, following the procedure of Example 2, but substituting equivalent amounts of other acylating agents, for example, propionic anhydride or butyryl chloride, there is obtained the respective propionate and butyrate derivatives.

EXAMPLE 3

4α,8,14-trimethyl-18-nor-5α,8α,14β-androstane-3,11,17-trione

A solution of 30 mg. of 3α-hydroxy-4α,8,14-trimethyl-18 - nor-5α-,8α,14β-androstane-11,17-dione in 5 ml. of acetone is treated with an excess of chromic acid-sulfuric acid solution. After fifteen minutes at room temperature, the excess chromic acid is decomposed with methanol and the solution diluted with water. After evaporation of the solvent, the aqueous suspension is extracted with methylene chloride, and the methylene chloride washed with saturated sodium chloride, dried over magnesium sulfate and evaporated. Two recrystallizations from ethanol give 14 mg. of 4α,8,14-trimethyl-18-nor-5α-8α,14β-androstane-3,11,17-trione, M.P. 253–257° C. $[\alpha]_D^{22}$ −154° (chf.)., $\lambda_{max.}^{Nujol}$ 5.77, 5.86, 5.92μ

NMR (CDCl$_3$) 8.95τ (singlet, 3H), 8.95τ (doublet, J=6, 3H), 8.85τ (singlet, 3H), 8.81τ (singlet, 3H).

*Analysis.*—Calc'd for C$_{21}$H$_{30}$O$_3$ (330.47): C, 76.32; H, 9.15. Found: C, 76.24; H, 9.18.

EXAMPLE 4

A solution of 116 mg. of non-crystalline 3α,17α-diacetoxy-4α,8,14-trimethyl-18-nor-5α,8α,9β,14β-androstane-11-one and 90 mg. of sodium borohydride in 10 ml. of absolute ethanol is stirred at room temperature for one hour. The reaction mixture is acidified with glacial acetic acid and the solvent evaporated. The residue is extracted with ethyl acetate, washed with saturated sodium chloride solution, dried and evaporated to give 119 mg. of crude product. Two recrystallizations from methanol give 42 mg. of 3α,17α-diacetoxy-11α-hydroxy-4α,8,14-trimethyl - 18-nor-5α,8α,9β,14β-androstane, M.P. 177–179°. The analytical sample has M.P. 178–180°, $[\alpha]_D$ −101.5° (chloroform).

*Analysis.*—Calc'd for C$_{25}$H$_{40}$O$_5$: C, 71.39; H, 9.59. Found: C, 71.30; H, 9.58.

EXAMPLE 5

To a solution of 77 mg. of 3-ethylenedioxy-4α,8,14-trimethyl - 18-nor-5α-8α,9α,14β-androstane-11,17-dione in 10 ml. of absolute ethanol 77 mg. of sodium borohydride are added and the mixture stirred at room temperature for ninety minutes. The solution is acidified with 10% acetic acid then diluted with water. The crystals which separate are filtered, washed with water and dried to give 50 mg. of 3 - ethylenedioxy - 4α,8,14-trimethyl-17α-hydroxy-18-nor-5α,8α,9α,14β-androstane-11-one having a melting point about 253–255°, $[\alpha]_D$ −148° (chloroform).

*Analysis.*—Calc'd for C$_{23}$H$_{36}$O$_4$ (376.52): C, 73.36; H, 9.64. Found: C, 73.54; H, 9.49.

EXAMPLE 6

A suspension of 100 mg. of lithium aluminum hydride in 5 ml. of tetrahydrofuran is added to a solution of 92 mg. of 3α-acetoxy-4α,8,14-trimethyl-18-nor-5α-8α,9α,14β-androstane-11,17-dione in 5 ml. of tetrahydrofuran and the mixture is heated at reflux for one hour. The reaction mixture is cooled and a saturated sodium sulfate solution is added slowly until two layers form. The organic layer is decanted, washed with saturated salt solution, dried and evaporated to give 86 mg. of crude product. Two recrystallizations from ether-hexane give 22 mg. of 3α,17α-dihydroxy - 4α,8,14-trimethyl-18-nor-5α,8α,9α,14β-androstane-11-one, M.P. 205–207° C., $[\alpha]_D$ −165° (chloroform). The analytical sample has M.P. 207–208°.

*Analysis.*—Calc'd for C$_{21}$H$_{34}$O$_3$: C, 75.40; H, 10.25. Found: C, 75.37; H, 10.3.

Examples 4 and 5 when compared indicate that the 11-ketone is rendered unreactive in the presence of the 9-alpha configuration, whereas in the 9-beta configuration the 11-ketone is reactive. From Example 6 it is evident that the 11-ketone in the 9-alpha configuration is unreactive.

The invention may be variously otherwise embodied within the scope of the appended claims.

What is claimed is:
1. A compound of the formula

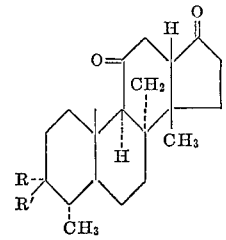

wherein R' is hydrogen; R is selected from the group consisting of hydroxy and acyloxy and together R and R' is oxo (O=), wherein the acyl is of a hydrocarbon carboxylic acid of less than twelve carbon atoms.

2. A compound in accordance with the formula of claim 1 having the name 3α-hydroxy-4α,8,14-trimethyl-18-nor-5α,8α,14β-androstane-11,17-dione.

3. A compound in accordance with the formula of claim 1 having the name 3α - acetoxy-4α,8,14-trimethyl-18-nor-5α,8α,14β-androstane-11,17-dione.

4. A compound in accordance with the formula of claim 1 having the name 4α,8,14 - trimethyl-18-nor-5α,8α,14β-androstane-3,11,17-trione.

References Cited
UNITED STATES PATENTS
3,316,281  9/1967  Diassi et al. _____ 260—397.3

ELBERT L. ROBERTS, *Primary Examiner.*